United States Patent [19]
Seidenberger et al.
[11] 4,174,292
[45] Nov. 13, 1979

[54] SPILL CONTROL COMPOSITION AND USE THEREOF

[75] Inventors: James W. Seidenberger, Bethlehem; Francis W. Michelotti, Easton, both of Pa.
[73] Assignee: J. T. Baker Chemical Company, Phillipsburg, N.J.

[21] Appl. No.: 888,230
[22] Filed: Mar. 20, 1978
[51] Int. Cl.[2] .............. C09K 3/32; B01J 1/22
[52] U.S. Cl. .............. 252/189; 252/192; 252/259.5; 252/88; 252/438; 34/DIG. 1; 210/DIG. 1
[58] Field of Search .............. 252/189, 192, 259.5, 252/88, 426, 438, 443; 34/DIG. 1; 210/59, DIG. 1

[56] References Cited

U.S. PATENT DOCUMENTS

| | | | |
|---|---|---|---|
| 475,586 | 5/1892 | Mauro | 252/259.5 |
| 2,073,398 | 3/1937 | Chesny | 252/189 |
| 2,997,445 | 8/1961 | Nuhn | 252/192 |
| 3,963,637 | 6/1976 | Chappell | 252/192 |
| 3,994,821 | 11/1976 | Seidenberger | 252/192 |
| 4,105,576 | 8/1978 | Seidenberger | 252/189 |

*Primary Examiner*—Benjamin R. Padgett
*Assistant Examiner*—Irwin Gluck
*Attorney, Agent, or Firm*—George W. Rauchfuss, Jr.; Eugene O. Retter

[57] ABSTRACT

A spill of acid is controlled and cleaned up by being neutralized by a low metal ion fluid neutralizer composition formed of a non-volatile organic amine compound, a foam-forming surfactant and a pH indicator dye and which can additionally contain water, a dissolved gas and color tinting agents. Such a neutralizer composition is especially useful in the electronics manufacturing industry and in clean rooms where the presence of metal ions would be deleterious.

6 Claims, No Drawings

SPILL CONTROL COMPOSITION AND USE THEREOF

FIELD OF THE INVENTION

The present invention relates to a composition and the use thereof for controlling and cleaning up acid spills.

BACKGROUND OF THE INVENTION

The properties of mineral acids are such that these acids can cause serious and painful burns to exposed skin or eyes. Moreover, spills of concentrated mineral acids evolve irritating and harmful fumes which can also lead to deleterious results. Spilled concentrated mineral acids should therefore not be allowed to contaminate the air and water. Generally, reaction of the concentrated mineral acids with water and/or most neutralizing substances involves the evolution of much heat and is therefore avoided.

Therefore, there is a need for a composition of matter for controlling and cleaning up spilled acids including mineral acids at a relatively safe rate and at a cost that is not prohibitively expensive.

Recently there was developed a spill control composition for control and clean up of acid spills. Such a composition was disclosed in U.S. Pat. No. 3,994,821 issued Nov. 30, 1976 to J. W. Seidenberger and assigned to J. T. Baker Chemical Company. While such a composition has found wide acceptance and utility in a wide array of circumstances under which spills of acids occur, there are certain circumstances and conditions where the use of such a spill control composition is not desirable or can lead to the development of unacceptable conditions. One such condition where the previously disclosed spill control composition would not generally be employed would be in the electronics manufacturing industry, especially where semiconductors or semiconductor materials are being manufactured. The presence of certain metals or metal ion contaminants change the semiconducting properties of semiconductors. For example, sodium or potassium ion contaminants that contact the germanium or silicone surfaces of semiconductor materials work into the lattice structure of the material and control of the conductivity of the material is lost and can even destroy the semiconducting abilities. Additionally, in clean rooms the presence of metal or metal ion contaminants is generally to be avoided.

Thus there is clearly a need for a composition of matter for controlling and cleaning up spilled acids in such environments as the electronics manufacturing industry and in clean rooms. Moreover, such a spill control composition should produce the desired control and cleanup at a relatively safe rate and at a cost that is not prohibitively expensive.

SUMMARY OF THE INVENTION

It has now been found that a fluid composition composed of a non-volatile organic amine compound, a foam-forming surfactant and a pH indicator dye and which can additionally contain water, a dissolved gas and color tinting agents is especially useful for the control and cleanup of spilled acids. Such a composition is substantially free of metal or metal ion contaminants.

The invention is useful in providing a simple, safe and controlled method for neutralizing acid spills in environs where contamination by extraneous metal ions may or may not be tolerated. The invention's pH color indicator feature also provides a useful, positive visual means for determining when sufficient neutralizer has been applied and mixed with the spill for complete neutralization of the acidic material.

DETAILED DESCRIPTION OF THE INVENTION

The fluid composition useful for the purpose of this invention is composed of about 55 to 99% of a non-volatile organic amine selected from a water soluble polyalkyleneimine polymer or an alkanolamine, from about 0 to 45% water, from about 0.01 to 2% pH indicator dye, about 0 to 10% dissolved gas, from about 0.2 to 3% of a surfactant which is foam-forming under acid or neutral conditions and from about 0 to 1% of a color tinting agent.

The non-volatile organic amines useful for the purposes of this invention are water soluble polyethyleneimine polymers or alkanolamines. As examples of alkanolamine there may be mentioned, for example, monoethanolamine, diethanolamine, triethanolamine, N-methyl ethanolamine, N,N-dimethyl ethanolamine, N,N-diethyl ethanolamine, N,N-diisopropyl ethanolamine, N-aminoethyl ethanolamine, N-methyl diethanolamine, monoisopropanolamine, diisopropanolamine, triisopropanolamine, mixed isopropanolamines, and mixture thereof. As examples of polyethyleneimine polymers there may be mentioned the Dow PEI series of polyethyleneimine polymers such as those described at page 2 and 3 of the Dow Chemical Company Technical Bulletin No. 192-328-74. Production of polyethyleneimine polymers is disclosed, for example, in U.S. Pat. No. 2,182,306 issued to H. Ulrich and Walter Marz on Dec. 5, 1939.

As examples of gases suitable for use in the composition of this invention there may be utilized any suitable gas or propellant capable of being dissolved in the fluid composition, among which may be mentioned, for example, carbon dioxide, and the various halogenated hydrocarbons, particularly chlorofluorocarbons such as trichlorofluoromethane, dichlorodifluoromethane, dichlorofluoromethane, methylene chloride, 2-chloropropane and the like.

The addition of a gassing agent such as carbon dioxide or the like in combination with a foam-producing surfactant in the formulation creates an acid neutralizer which foams on contact with the acidic spill material. The foam blanket thus formed suppresses the release of toxic and irritating volatile fumes and tends to moderate the reaction rate between the neutralizer and acid. The liquid form of the neutralizer composition also minimizes extraneous contamination of the spill area by avoiding dusting problems on application to the spill as occurs with solid neutralizer compositions. Liquid waste slurries are also much easier to clean up and are generally more compatible with existing liquid waste treatment facilities.

The suitable pH dye indicators useful in the compositions of this invention are any suitable indicator dye evidencing a perceptible color change in the range of pH from about 4.0 to 10.0. Especially preferred is a solid pH indicator evidencing a perceptible color change in the range of pH from 5.0 to 7.0. Especially preferred as the pH indicator is bromothymol blue evidencing such color change in the pH range of 6.0 to 7.6. As examples of other suitable pH indicators useful in the compositions of this invention there may be mentioned alizarin, nitrazine yellow, bromothymol blue, rosalic acid, neutral red, phenol red and the like and their water soluble salts.

As examples of suitable surfactants that are foam-forming under acid and neutral conditions there may be mentioned, for example, ethoxylated and sulfated lauryl alcohols, sodium dioctylsulfosuccinate, potassium perfluoroethyl sulfonates, the ammonium salt of ethoxylated and sulfated lauryl alcohol, ethylene oxide adducts of isooctyl or nonyl phenol as well as various fatty alcohols, linear alkyl sulfonates derived from straight chain alkyl benzenes and the like. Other suitable foam-forming surfactants will be evident to one skilled in the art.

Optionally, various suitable coloring and tinting agents may be added to the compositions of this invention for the purpose of providing a more distinct visual means for detecting the indicator color change upon neutralization of the spill. There may be mentioned, for example, as examples of such suitable coloring and tinting agents, titanium oxide pigment and dyes and colorants such as Hansa Yellow #WD-2412, Organic Yellow—Primrose #WD-2401 and the like.

The spill control compositions of this invention will be substantially free of deleterious metal or metal ion contaminants. That is, the compositions will generally contain less than about 0.08%, more particularly less than about 0.03 to 0.08% and most preferably less than about 0.03% metal or metal ion.

The compositions of this invention are prepared, for example, by diluting the organic amine component with any water utilized and then introducing the soluble gas into the solution with mixing in any suitable mixing chamber. Thereafter the indicator dye, surfactant and any dyes or tinting agents employed are added and mixed until a homogenous product is obtained.

As an example of a typical neutralizer composition of this invention there may be mentioned, for example, the following composition.

Formulation I

| Component | Weight % |
|---|---|
| Polyethyleneimine polymer (Dow PEI-6) | 55.30 |
| Sodium salt of an ethoxylated and sulfated lauryl alcohol (Conco Sulfate 219) | 0.20 |
| Carbon dioxide | 4.68 |
| Bromothymol blue, $Na^+$ | 0.02 |
| Water | 39.80 |
| | 100.00 |

Another typical composition of this invention containing optional coloring or tinting is the above Formulation I with the addition of up to the following percent of listed coloring or tinting agents:

| % (up to) | |
|---|---|
| 1.0 | Titanium oxide |
| 0.5 | Hansa Yellow #WD-2412 |
| 0.5 | Organic Yellow - Primrose #WD-2401 |

Other typical formulations of compositions of this invention are the following:

Formulation II

| Component | Weight % |
|---|---|
| Diethanolamine | 89.29 |
| Water | 10.50 |
| Bromothymol blue, $Na^+$ | 0.01 |
| Sodium salt of an ethoxylated and sulfated lauryl alcohol (Conco Sulfate 219) | 0.20 |
| | 100.00 |

Formulation III

| Component | Weight % |
|---|---|
| Diethanolamine | 94.29 |
| Carbon dioxide | 5.50 |
| Bromothymol blue, $Na^+$ | 0.01 |
| Sodium salt of an ethoxylated and sulfated lauryl alcohol | 0.20 |
| | 100.00 |

Formulation IV

| Component | Weight % |
|---|---|
| Diethanolamine | 99.79 |
| Bromothymol blue, $Na^+$ | 0.01 |
| Sodium salt of an ethoxylated and sulfated lauryl alcohol | 0.20 |
| | 100.00 |

As examples of acids that may have spills thereof controlled and cleaned up by the composition of this invention there may be mentioned mineral acids, such as hydrobromic acid, hydroiodic acid, hydrochloric acid, nitric acid, phosphoric acid, sulfuric acid and mixed mineral acids as well as organic acid spills.

Following an acid spill a composition of this invention may be employed to control and clean up substantially all the spilled acid by applying the composition to the spill surface, preferably around the perimeter of the spill in a quantity sufficient to neutralize all the spilled acid. Using a squeegee or acid resistant brush, mix the composition inward into the spilled acid. Evolution of gas will begin indicating neutralization of the spilled acid is proceeding. Observation of the color change of indicator in the slurry will indicate when the slurry has reached an essentially safe pH condition for further handling. In the case of a composition containing bromothymol blue as the solid pH indicator a change from pink/yellow to blue will indicate such a safe state. After the slurry has reached a persistent blue color throughout, the slurry can be readily picked up off the spill surface by use of any suitable liquid vacuum or mop and placed into any suitable waste treatment system container, or by absorbing the liquid into an inert absorbent and disposing of the same in accordance with any applicable environmental disposal regulations.

From the foregoing it will be seen that a composition and method have been provided which will eliminate quickly and easily the hazard to persons working under conditions susceptible to spillage of mineral acids, especially in conditions where certain deleterious metal or metal ion contaminants is to be avoided.

It will be understood that the embodiments discussed herein and the use for the embodiments are merely illustrative of my invention and that one skilled in the art can make suitable modifications thereof without departing from the spirit and intent of the invention.

What is claimed is:

1. A composition useful for the control and cleanup of mineral acid spills comprising: about 55 to 99% by weight of a non-volatile organic amine component selected from the group consisting of a water soluble polyethylineimine polymer or an alkanolamine; from about 0 to 45% by weight water, from about 0.01 to 2% by weight pH indicator changing color in the range pH 4.0 to 10.0, from about 0 to 10% by weight dissolved gas, from about 0.2 to 3% by weight of a surfactant which is foam-forming under acidic or neutral conditions and from about 0 to 1% by weight of a color tinting agent.

2. The composition of claim 1 wherein the composition contains less than about 0.08% by weight of deleterious metal or metal ion contaminants.

3. The composition of claim 2 wherein the amine component is a polyethyleneimine polymer, the surfactant is a sodium salt of an ethoxylated and sulfated lauryl alcohol, the dissolved gas is carbon dioxide and the pH indicator is bromothymol blue.

4. The composition of claim 3 having the following components and in the specified amounts:

| Component | amount - % by weight |
|---|---|
| polyethyleneimine polymer | 55.30 |
| sodium salt of an ethoxylated and sulfated lauryl alcohol | 0.20 |
| carbon dioxide | 4.68 |
| bromothymol blue, $Na^+$ | 0.02 |
| water | 39.80 |

5. A method for the control and cleanup of spilled mineral acid comprising contacting said spilled mineral acid with a composition of claim 1 and disposing of the resulting slurry after the change in color of the pH indicator in the slurry evidences that the slurry has reached an essentially safe pH condition.

6. A method for the control and cleanup of spilled mineral acid comprising contacting said spilled mineral acid with a composition of claim 4 and disposing of the resulting slurry after the change in color of the pH indicator evidences that the slurry has reached an essentially safe pH condition.

* * * * *